United States Patent
Scott et al.

(10) Patent No.: US 6,935,680 B2
(45) Date of Patent: Aug. 30, 2005

(54) VEHICLE SLEEPER PANEL DESIGN

(75) Inventors: Andrew C. Scott, Fort Wayne, IN (US); Joel D. Reed, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/759,685

(22) Filed: Jan. 16, 2004

(65) Prior Publication Data

US 2004/0169399 A1 Sep. 2, 2004

Related U.S. Application Data

(60) Provisional application No. 60/440,998, filed on Jan. 17, 2003.

(51) Int. Cl.[7] .................................................. B60P 3/32
(52) U.S. Cl. ............. 296/190.02; 296/191; 296/193.05; 296/181.2
(58) Field of Search .............................. 296/191, 24.41, 296/181.1, 181.2, 190.01, 190.02, 190.08, 193.05; 428/167, 178

(56) References Cited

U.S. PATENT DOCUMENTS

| | | | | |
|---|---|---|---|---|
| 5,042,395 A | * | 8/1991 | Wackerle et al. ............ 105/397 |
| 5,140,913 A | * | 8/1992 | Takeichi et al. ............. 105/397 |
| 5,190,803 A |   | 3/1993 | Goldbach et al. |
| 5,685,229 A | * | 11/1997 | Ohara et al. ................. 105/397 |
| 5,735,568 A | * | 4/1998 | Arnold .................... 296/190.02 |
| 5,863,093 A | * | 1/1999 | Novoa et al. ........... 296/190.01 |
| 5,940,949 A |   | 8/1999 | Rink |
| 6,076,884 A | * | 6/2000 | Osman .................... 296/190.02 |
| 6,120,089 A | * | 9/2000 | Kalstiantz et al. ......... 296/186.1 |
| 6,178,612 B1 | * | 1/2001 | Gernstein .................... 29/401.1 |
| 6,276,748 B1 | * | 8/2001 | Gobessi et al. ......... 296/190.02 |
| 6,625,860 B1 | * | 9/2003 | Gernstein .................... 29/401.1 |
| 6,672,642 B1 | * | 1/2004 | Seksaria et al. ............... 296/50 |
| 6,682,129 B2 | * | 1/2004 | Baggett et al. ......... 296/190.02 |
| 6,761,395 B2 | * | 7/2004 | Charbonnel ................. 296/208 |
| 2001/0053431 A1 | * | 12/2001 | Goldbach et al. ........... 428/139 |
| 2003/0227195 A1 | * | 12/2003 | Charbonnel ................. 296/208 |
| 2003/0234556 A1 | * | 12/2003 | Baggett et al. ......... 296/190.02 |
| 2004/0105949 A1 | * | 6/2004 | Krause ......................... 428/57 |

* cited by examiner

Primary Examiner—Patricia L. Engle
(74) Attorney, Agent, or Firm—Jeffrey P. Calfa; Dennis Kelly Sullivan; Susan L. Lukasik

(57) ABSTRACT

Plastic-metal hybrid materials are included in the construction of highway tractor sleeper sides and back panel assemblies. Sleeper panels are traditionally constructed of two elements, the panel assemblies and the interior trim. A molded panel becomes both the interior of the structure and the decorative interior surface. This allows interior components to be directly mounted to the integral structural panels. The resulting sleeper will have stronger engagement to the mounted components such as cabinetry as well as part number reduction.

18 Claims, 8 Drawing Sheets

VEHICLE SLEEPER PANEL DESIGN

This is a patent issuing from a non-provisional patent application, which claims the priority of provisional patent application Ser. No. 60/440,998, filed Jan. 17, 2003.

BACKGROUND

Sleeper boxes whether integral to the cab or separate from the cab of a highway tractor have traditionally been designed as structures that have their own inherent integrity. These structures are then painted and the interior trim and fitments installed. The purpose of the sleeper is to provide space for the installation of one or two bunk beds, together with a variety of cabinetry for storage. The use of a sleeper on a truck allows the driver to rest and sleep when he/she is on the road and away from home.

Being a fundamental part of the cab structure, the sleeper section has to meet various performance requirements associated with the proper operation of the vehicle. These include but are not limited to the minimization of noise from panel vibration, the ability to withstand loads when tested in accordance with SAE recommended practices and the insulation of the interior space from excessive heat or cold.

The interior trim provides a decorative surface to the interior of the sleeper body and is also used as part of the noise and heat attenuation system. In order to provide the appropriate levels of dimensional and cosmetic quality the parts for the sleeper structure and the interior are manufactured using high quality tooling that is also costly to manufacture and maintain.

This invention entails making vehicle sleeper panels out of plastic-metal hybrid panels and installing these lightweight and strong panels into vehicles. This will allow sleeper trim components to be installed directly to the integral structural portions of the new panels. The invention involves a new use for an old technology in the use of the plastic-metal hybrid panels.

SUMMARY

The object of the invention is to provide a new lightweight panel that may be used in the construction of sleeper compartments for highway tractors. The invention covers the adaptation of pre-existing technologies for plastic-metal hybrid materials to the construction of sleeper sides and back panel assemblies. Sleeper panels are traditionally constructed of two elements, the panel assemblies and the interior trim. This invention uses a molded panel to become both the interior of the structure and the decorative interior surface. This will allow interior components to be directly mounted to the integral structural panels. The resulting sleeper will have stronger engagement to the mounted components such as cabinetry as well as part number reduction.

One of the existing plastic-metal hybrid technology processes that allows for implementation of this invention are described in U.S. Pat. Nos. 5,190,803 and 5,842,265, which are incorporated by reference into this application. Other plastic-metal hybrid materials exist and also may apply in the implementation to this invention. These previous processes have been described as hybrid injection-molding technology and incorporate metal reinforcements into the assembly at the time of molding. The normal usage of these prior processes has only been in applications that are not critical for appearance. The use on a sleeper interior will be a new application that has significant quality and appearance requirements. One embodiment may involve the use of a metal structural panel for the panel assembly with injection molded plastic ribbing for additional strength. The interior panel or inner wall of the sleeper may also be integrally injection molded to bond to the interior panel assembly. The use of the hybrid injection-molding process allows the use of simple metal reinforcements that are hidden inside the body cavity and can, therefore, be tooled simply. The assembly may also incorporate molded foam that fills the cavity between the inner surface and the outer body panel providing the required thermal and acoustic insulation for sleeper compartment. These assemblies may be attached to each other and to the floor structure after paint using a mechanical fastener and/or adhesive.

DESCRIPTION

Figure 1:
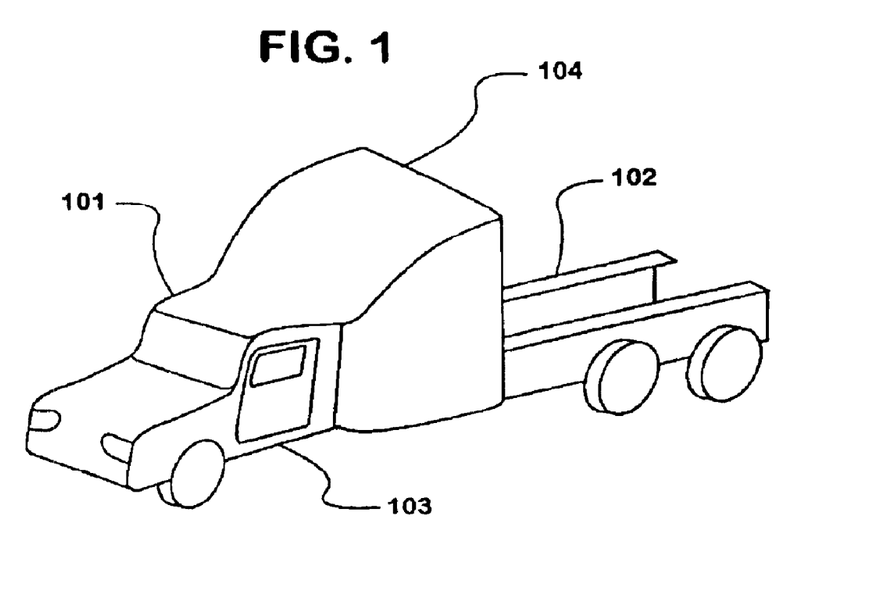
FIG. 1 is a perspective of a mobile vehicle such as a heavy-duty truck vehicle containing a sleeper compartment such as the type that may use at least one embodiment of this invention.
Figure 2:
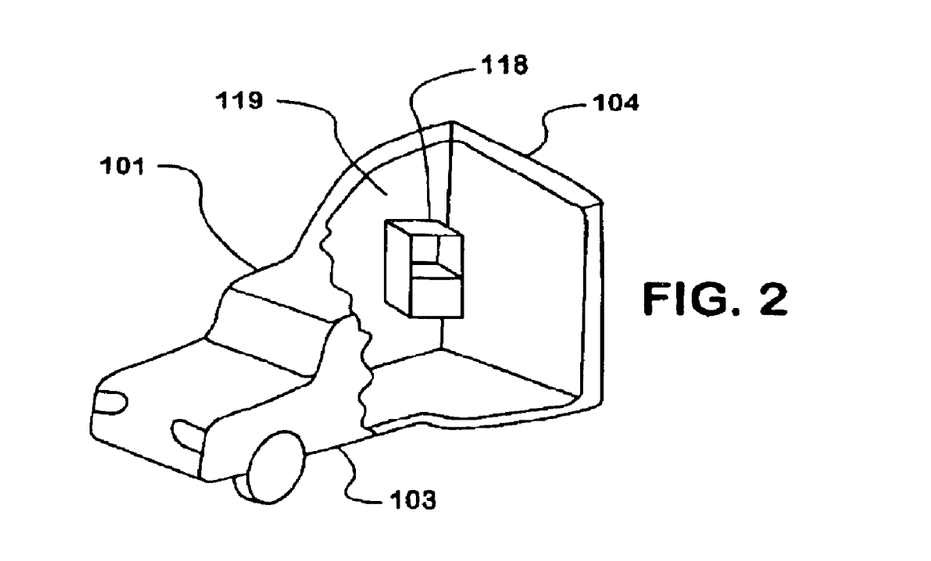
FIG. 2 is a partial cutaway view of the vehicle of FIG. 1.
Figure 3:
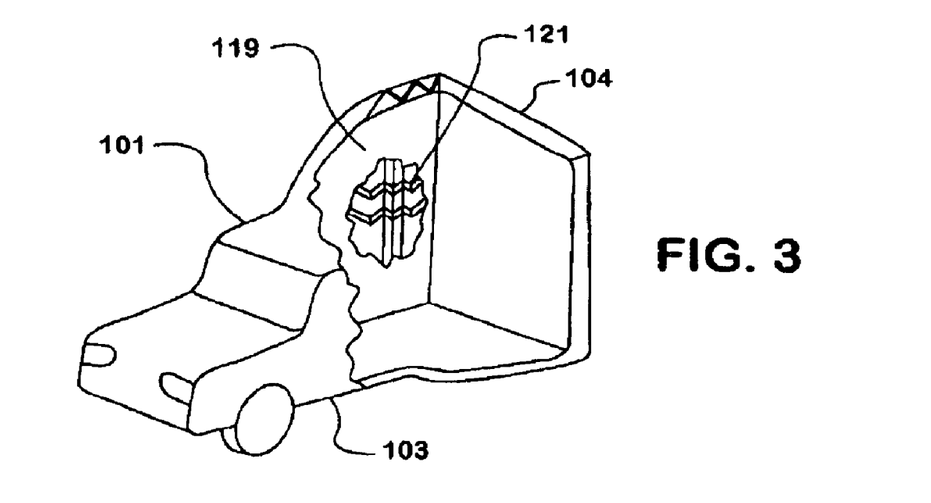
FIG. 3 is a further cutaway view of the vehicle of FIG. 1 providing a view of one of the embodiments of the invention.

The integrated interior side reinforcement and interior trim panel of this invention may be used on the vehicle 101 shown in FIGS. 1 to 3. The vehicle 101 has a chassis 102 with a driver's cab 103 engaged. If the vehicle 101 is an over the road type vehicle in which the drivers may need on the road rest, the vehicle will have a sleeper compartment 104 engaged to the cab 103 and chassis 102. The sleeper 104 has an integrated interior side reinforcement and interior trim panel 119. There is a panel in a similar shape on the opposite side of the sleeper 104. Interior cabinets 118 or furniture such as sleeping bunks may be mounted directly to the integrated reinforcement and interior trim panel 119.

Figure 4:
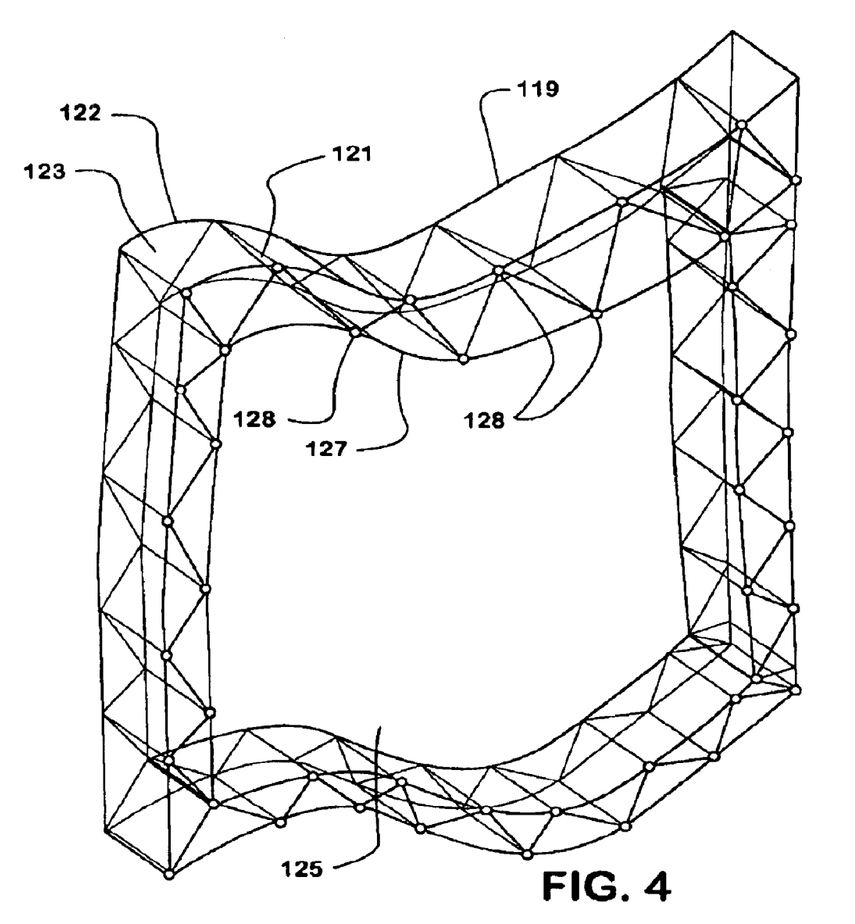
FIG. 4 is a perspective view of an interior panel assembly of the embodiment of the invention shown in the vehicle of FIG. 1.
Figure 5:
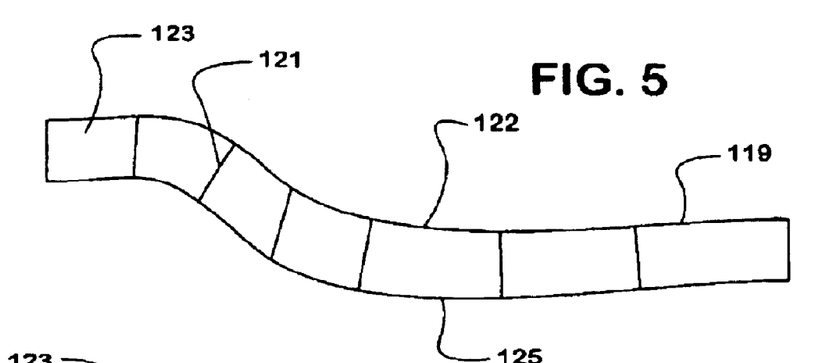
FIG. 5 is a top down view of the panel of FIG. 4.
Figure 6:
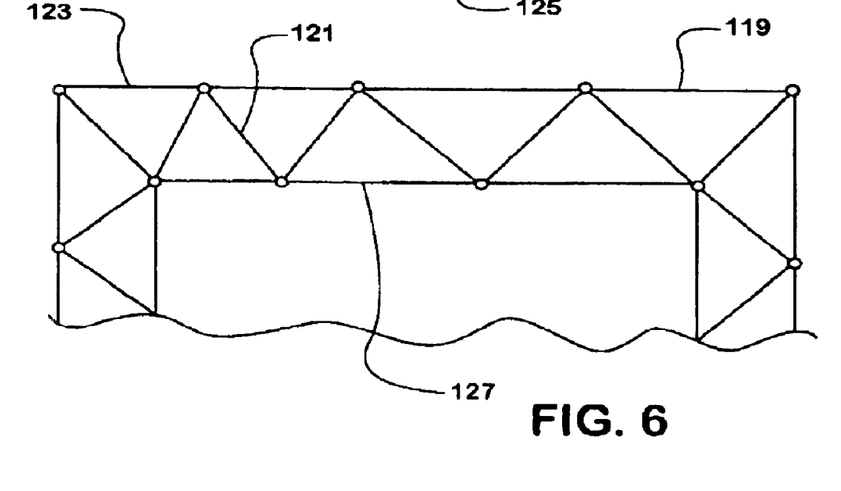
FIG. 6 is a partial side view of the panel of FIG. 4.

The integrated reinforcement and interior trim panel 119 is shown in FIGS. 4 to 6. The panel includes a metal interior structural panel or shell 122 that is pressed into a shape that includes structural sides 123. There may be a support channel 127. There are plastic injection molded Z-shaped reinforcing and support ribs 121 that ideally are injected through holes in the metal structural panel 122. The ribs 121 are formed in zigzag pattern about the reinforcement and trim panel 119. Where there is a support channel 127, the reinforcing and support ribs 121 may be engaged along and across the support channel 127 with engagement at discrete engagement locations 128 along the support channel 127. These discrete engagement locations 128 may correspond to plastic injection points for the injection mold. The metal of the interior structural panel may be zinc-coated steel sheets and/or steel sheets provided with a primer and optionally adhesion-promoter, untreated, anodized aluminum sheets and/or aluminum sheets provided with a primer and optionally an adhesion-promoter are particular suitable. Partially crystalline plastics, such as glass-fiber reinforced polyamide 6, polyamide 6,6, polybutylene terephthalate, polyphenylene sulphide or propylene are suitable as plastics for injecting in the reinforcing ribs 121. This design provides strength to the metal interior structural panel 122 without the additional weight that a traditional separate metal reinforcement would have provided. Weight is an important issue in tractor-trailers in applications where the vehicles operate at their legal limit. If 80 to 100 pounds may be removed from each sleeper side panel, then the driver may carry an additional 160 to 200 pounds load and since some contract payments are determined on the basis of weight, the use of this invention may save drivers and fleet managers considerable amounts of money on an annual basis. The reinforcement and trim panel may also include an integrally injection molded interior trim surface 125. Cabinets 118 and other sleeper furnishings may be mounted to the interior trim surface 125 given the strength emboldened upon the reinforcement and trim panel 119 from the reinforcing ribs 121 and metal interior structural panel or shell 122.

Figure 7:
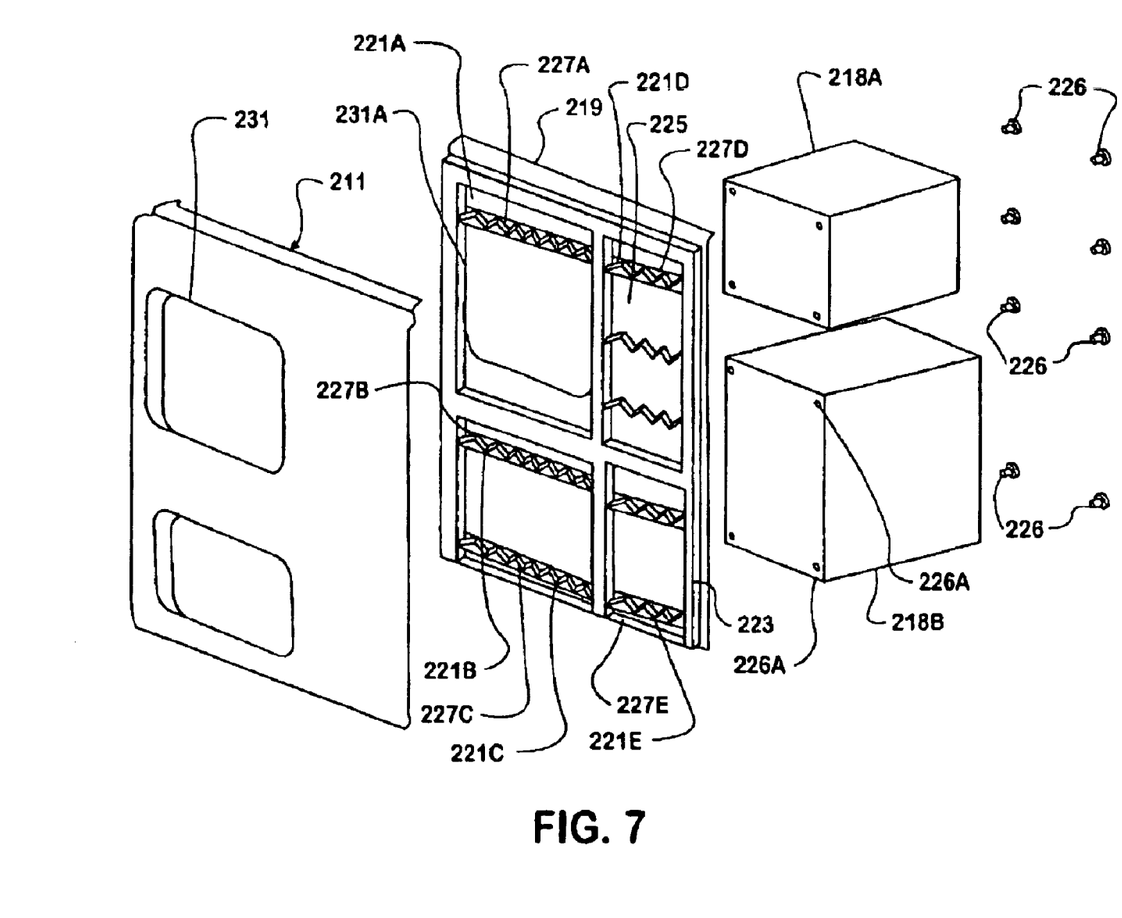
FIG. 7 is an exploded view of a second embodiment of an integral interior structural panel and interior trim panel along with an exterior panel and interior trim cabinets made in accordance with the invention.
Figure 8:
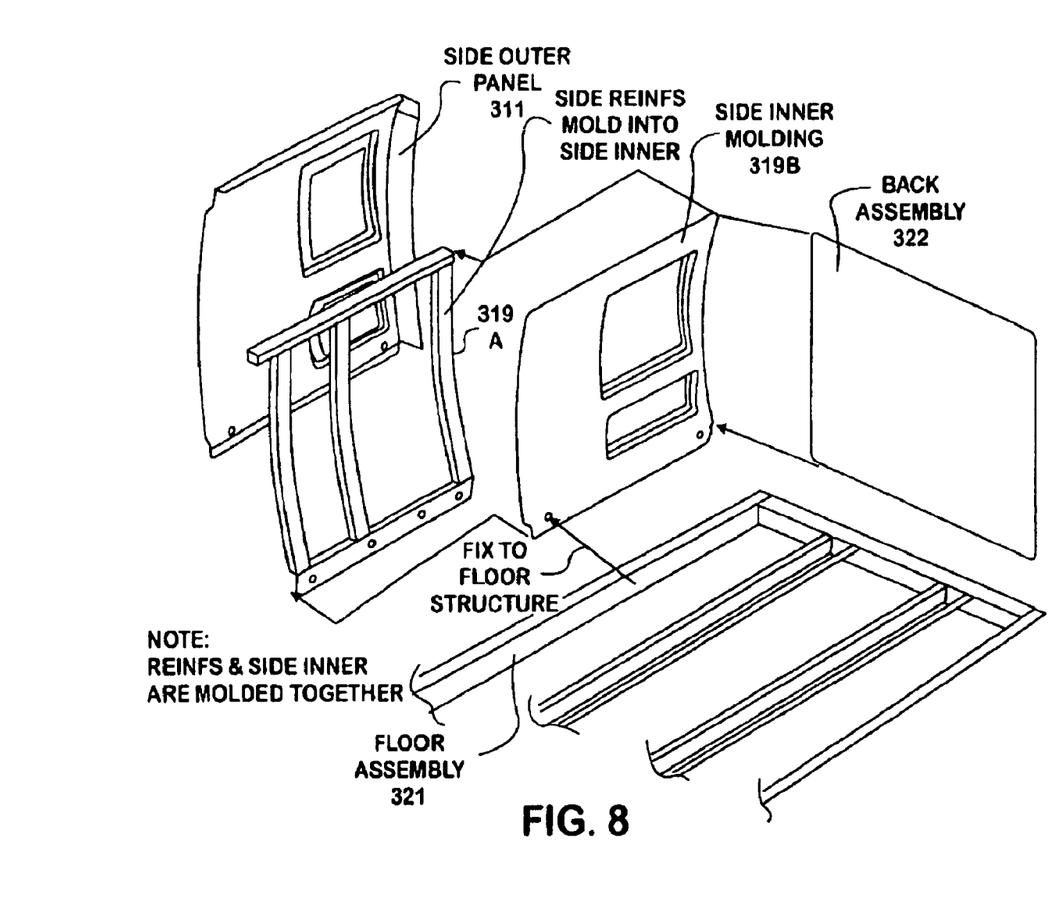
FIG. 8 is an assembly view of the sleeper portion of a mobile vehicle.
Figures 9, 10A, 10B:
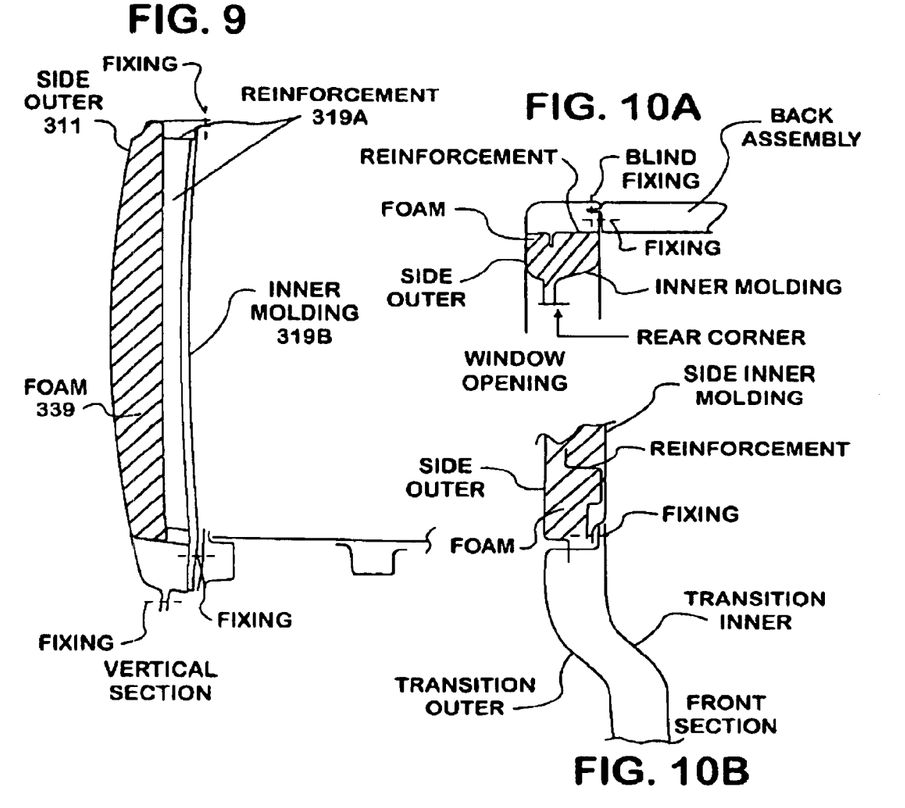
FIG. 9 is a cutaway vertical section of the integrated reinforcement and inner molding of the vehicle of FIG. 8.
FIG. 10A is a top down cutaway view of the interface between the integrated reinforcement and inner molding and a back assembly of the sleeper of FIG. 9.
FIG. 10B is a top down cutaway view of the interface between the integrated reinforcement and inner molding and a transition section to the cab of the sleeper of FIG. 9.

FIG. 7 is an exploded view of a second embodiment of an integral interior structural and interior trim panel 219 along with an exterior panel 211 and interior trim cabinets 218A and 218B. The exterior panel 211 may contain openings 231 for either windows or access areas. The structural and interior trim panel 219 needs to have corresponding openings 231A. Under the prior art the extra supports in the structural panel would have been made of metal and there would have been a significant increase in panel weight. In this invention, there is a significant weight reduction due to the use of plastic-metal hybrid materials. The structural and interior trim panel 219 has a generally hollow sheet metal support frame 223 that runs around the sides and upper portions of the panel as well as adjacent to the openings 231A. There are support channels 227A, 227B, 227C, 227D, and 227E. The support channels 227A, 227B, 227C, 227D, and 227E contain reinforcing and support rib matrixes 221A, 221B, 221C, 221D, and 221E. These support rib matrixes 221A, 221B, 221C, 221D, and 221E may be made of zigzagged plastic material that provides bracing and support to the support channels and the structural and interior trim panel 219. The structural and interior trim panel 219 may include an interior trim surface 225 that provides a high quality inner wall surface for the sleeper 104. Cabinetry or other interior furnishings 218A and 218B may be mounted directly to the inner surface 225 of the structural and interior trim panel 219 using conventional fasteners 226 through mounting holes 226A. Once again the metal and plastic of the structural and interior trim panel 219 may be formed together using a prior art plastic-metal hybrid injection molding technology.

Referring to FIGS. 8, 9, 10A, and 10B, the invention entails integrating the side reinforcement piece 319A with the side inner molding trim piece 319B. The side outer panel 311 would be engaged to the integral side reinforcement piece 319A and side inner molding trim piece 319B. The sleeper 104 could be assembled with the side outer panel 311 and the integral side reinforcement piece 319A and side inner molding trim piece 319B being engaged to both the sleeper floor assembly 321 as well as the sleeper back assembly 322. Additionally, the design may include integration of a foam exterior 339 on the outer side of the reinforcement piece 319A. This foam 339 on the integrated sidepiece will provide sound dampening as well as thermal insulation for the sleeper unit 104. The integration of the foam 339 to the outer portion of the reinforcement 319A allows structural support for this sound dampener and thermal insulator. The integration allows single piece installation during sleeper 104 manufacture.

Figure 11:
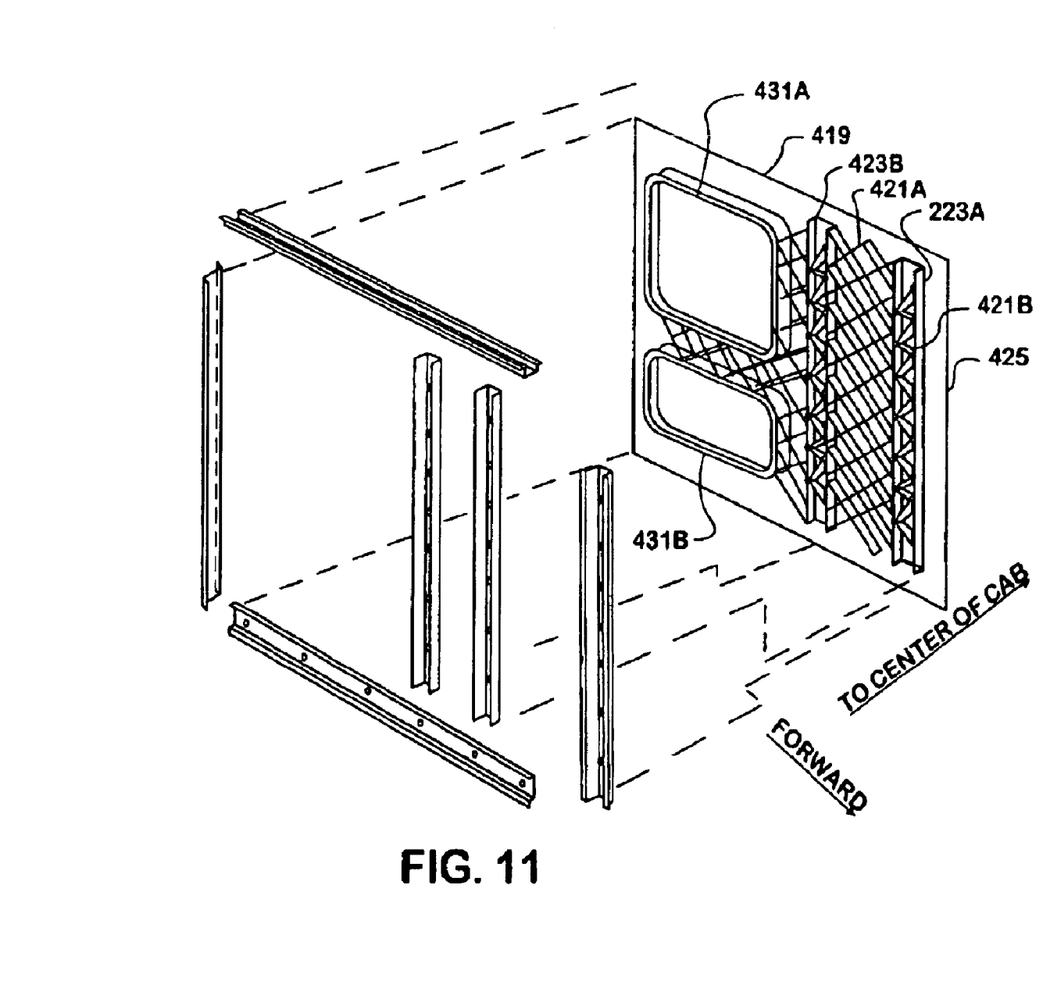
FIG. 11 is an exploded view of an additional embodiment of an integrated reinforcement and interior trim panel made in accordance with the invention.

Another embodiment of an integrated reinforcement and interior trim panel 419 is shown in FIG. 11. The reinforcement and trim panel 419 has an inner trim surface panel 425 and a crosshatched rib matrix of alternate direction ribs 421A and 421B. The reinforcement and trim panel 419 and alternate direction ribs 421A and 421B are comprised of a plastic. There are also integrated metal support pieces 423A and 423B and window or opening frames 431A and 431B engaged to the reinforcement and trim panel 419 and the alternate direction ribs 421A and 421B. The integrated metal support pieces 423A and 423B and window or opening frames 431A and 431B may be engaged to the plastic coating by an injection molding process such as a plastic-metal hybrid process.

As described above, the sleeper panel design of this invention and the vehicle 101 with the sleeper panel installed provide a number of advantages, some of which have been described above and others of which are inherent in the invention. Also modifications may be proposed to the sleeper panel design of this invention and the vehicle 101 with the sleeper panel installed without departing from the teachings herein.

We claim:

1. A highway tractor comprising:
   a chassis;
   a cab that comprises a driver compartment and is mounted on the chassis;
   a walled sleeper compartment that joins with the cab and comprises an exterior wall panel and a plastic-metal hybrid interior wall panel joined together to form a wall of the sleeper compartment;
   wherein plastic of the hybrid interior wall panel comprises an interior wall surface that is presented to the sleeper compartment interior and is structurally reinforced by a metal part of the hybrid panel to which the plastic has been molded through openings in the part where the plastic joins with the part, and the part is disposed internally of the wall between the exterior panel and the interior wall surface.

2. A highway tractor as set forth in claim 1 wherein the part comprises sheet metal shaped to have sides, and some of the plastic is disposed internally of the wall as reinforcing ribs joining with one side of the part.

3. A highway tractor as set forth in claim 2 including a support part disposed internally of the wall, and wherein the reinforcing ribs are arranged between the one side of the metal part and the support part and also join with the support part.

4. A highway tractor as set forth in claim 2 wherein the reinforcing ribs, when viewed normal to the interior wall surface, have z-shapes arranged successively along the one side of the part.

5. A highway tractor as set forth in claim 4 wherein the one side of the part is substantially normal to the interior wall surface.

6. A highway tractor as set forth in claim 4 further including a support part disposed internally of the wall, and wherein the reinforcing ribs are arranged between the one side of the metal part and the support part and also join with the support part.

7. A highway tractor as set forth in claim 1 wherein the plastic comprises partially crystalline plastic.

8. A highway tractor as set forth in claim 1 including insulating material disposed internally of the wall in at least some of the space not occupied by that portion of the interior wall panel that is between the exterior wall panel and the interior wall surface of the interior wall panel.

9. A highway tractor as set forth in claim 1 including a cabinet disposed within the sleeper compartment mounted on the interior wall surface of the interior wall panel.

10. A walled sleeper compartment for a highway tractor cab comprising:

an exterior wall panel and a plastic-metal hybrid interior wall panel joined together to form a wall of the sleeper compartment;

wherein the interior wall panel comprises a plastic interior wall surface that is structurally reinforced by a metal part of the hybrid panel to which the plastic has been molded through openings where the plastic joins with the part, and the part is disposed internally of the wall between the exterior panel and the interior wall surface.

11. A walled sleeper compartment as set forth in claim 10 wherein the part comprises sheet metal shaped to have sides, and some of the plastic is disposed internally of the wall as reinforcing ribs joining with one side of the part.

12. A walled sleeper compartment as set forth in claim 11 including a support part disposed internally of the wall, and wherein the reinforcing ribs are arranged between the one side of the metal part and the support part and also join with the support part.

13. A walled sleeper compartment as set forth in claim 11 wherein the reinforcing ribs, when viewed normal to the interior wall surface, have z-shapes arranged successively along the one side of the one metal part.

14. A walled sleeper compartment as set forth in claim 13 wherein the one side of the part is substantially normal to the interior wall surface.

15. A walled sleeper compartment as set forth in claim 13 further including a support part disposed internally of the wall, and wherein the reinforcing ribs are arranged between the one side of the metal part and the support part and also join with the support part.

16. A walled sleeper compartment as set forth in claim 10 wherein the plastic comprises partially crystalline plastic.

17. A walled sleeper compartment as set forth in claim 10 including insulating material disposed internally of the wall in at least some of the space not occupied by that portion of the interior wall panel that is between the exterior wall panel and the interior wall surface of the interior wall panel.

18. A walled sleeper compartment as set forth in claim 10 including a cabinet mounted on the interior wall surface of the interior wall panel for disposition within the sleeper compartment.

* * * * *